March 10, 1959  L. DIETRICH  2,876,864
SEPARATION OF DUST FROM SINTER WASTE GAS
Filed May 28, 1956  2 Sheets-Sheet 1
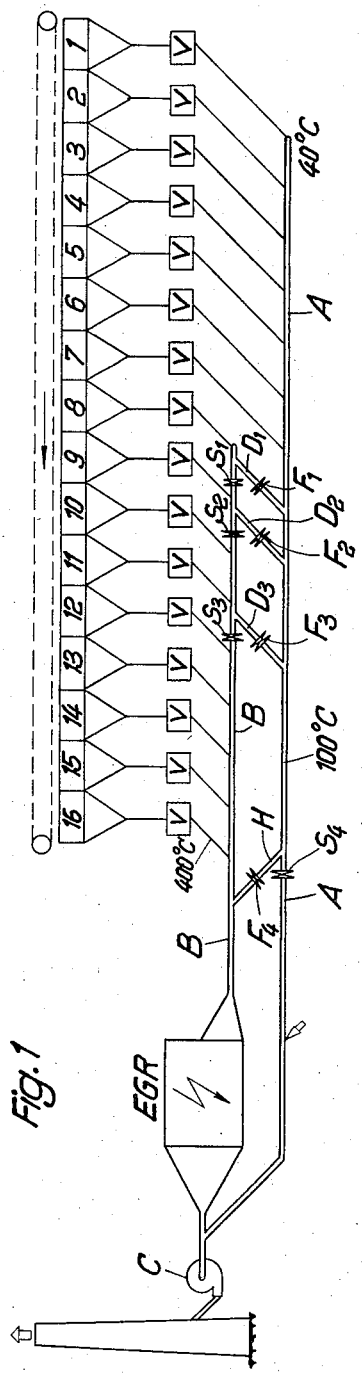
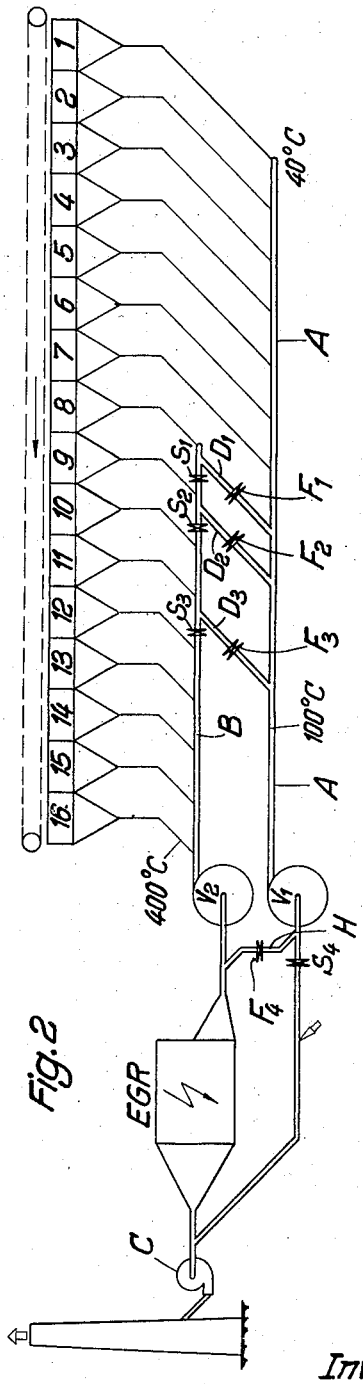
Inventor:
Leo Dietrich March 10, 1959     L. DIETRICH     2,876,864
SEPARATION OF DUST FROM SINTER WASTE GAS
Filed May 28, 1956     2 Sheets-Sheet 2

Fig. 3

Inventor:
Leo Dietrich
By Bailey Stephens and Huettig
Attorneys

United States Patent Office 2,876,864
Patented Mar. 10, 1959

2,876,864

SEPARATION OF DUST FROM SINTER WASTE GAS

Leo Dietrich, Frankfurt am Main, Germany, assignor to Metallgesellschaft Aktiengesellschaft, A. G., Frankfurt am Main, Germany Application May 28, 1956, Serial No. 587,854

Claims priority, application Germany June 10, 1955

4 Claims. (Cl. 183—114)

This invention relates to the separation of dust from waste gases, particularly from the waste gases coming from the sintering of iron ores.

In treating iron ores, the electrical precipitation of dust from the waste gases encounters difficulties in that deposits of wet dust of iron sulphate form on the electrodes, and become baked thereon like cement, and thus impede the electric field on the electrodes and ionizing wires and interfere with the dust precipitation. As the iron ores are pre-heated before being charged on the sintering belt, considerable water is evaporated from the ores during their travel for about ⅔ of the length of the belt, thus producing very humid waste gases at the beginning of the sintering. Also, some rather coarse and fine sinter material is drawn through the sintering grate along with the gases during about up to the first half of the travel of the belt. From this point on, the material on the belt is dry, and an increasing amount of dust is produced toward the end of the belt, with the greatest amount of dust being produced just before the end.

Upon starting a sintering apparatus, the suction apparatus is relatively cool so that condensates easily form from the gases first drawn from the material on the belt, and if passed directly to an electro-filter would hardly have reached a temperature above the dew point of the gases which would be from 40° to 50° C. However, when the plant is in full operation, the waste gases drawn from the last portion of the sintering belt have a temperature of about 400° C., at which temperature the gases easily cause disruptive discharges in the electro-filter. Consequently, the fluctuations in gas temperature and humidity make the electrical removal of dust therefrom, particularly in the sintering of iron ores, very uncertain and has resulted in the preferred use of the mechanical separation of dust from the gases.

The objects of the instant invention are to use both the mechanical and electrical separation of dust from gases in the most efficient manner, particularly in the sintering of iron ores.

In general, these objects are obtained by first separating the waste gases from the sintering bed into two flows, one flow having a temperature generally below 100° C., and the other flow being at a temperature above 100° C. The first flow is composed of the waste gases coming from about ⅓ to ⅔ of the first travel of the sintering belt, with the dust being mechanically removed from such gases. The second remaining flow has its gas electrically cleaned of dust. Upon occasion, all of the gas from the sintering bed can be first mechanically cleaned, and then divided into two flows for additional mechanical and electrical cleaning as set forth above.

As the waste gas temperatures change during the period from starting the sintering bed to full operation, the apparatus is provided with means for collecting relatively cool gas from over a greater extent of the sintering bed than when the apparatus is started up, then reducing the collecting length as the temperature of the gases rises during full operation.

The means by which the objects of the invention are obtained are described more fully with reference to the accompanying drawings, in which:

Figure 1 is a diagrammatic side view of the collection of the waste gases from a sintering bed into two separate flows;

Figure 2 is a similar view showing intermediate mechanical dust separation; and

Figure 3 is a modification showing a reverse arrangement of the waste gas removal means.

In the figures, a conventional sintering band is diagrammatically shown above a series of suction chambers 1 to 16, inclusive, the sintering band traveling in the direction shown by the arrow. Each suction chamber communicates with its respective mechanical dust separator V which may be of the form disclosed in German Patent No. 838,066 dated 5 May 1942. In Figures 1 and 2, the sintering belt is loaded or charged with iron ore above chamber 1, the material being discharged from the belt after it passes chamber 16. The temperature of the waste gases drawn into the suction chambers varies from about 40° C. for gases entering chamber 1 to about 400° C. for gases drawn into chamber 16. If the gases drawn through chambers 1 to 16 were mixed, the mixture of gases would have a temperature of about 150° C. in the case of the sintering of Lotharingian minette iron ores.

As shown in Figures 1 and 2, suction chambers 1 to 7, through their respective mechanical separators V, are connected with manifold A, and suction chambers 8 to 16 are likewise joined to manifold B. Manifold A is connected to suction fan C. Manifold B passes to the electrical dust remover EGR and then to suction fan C.

In order to connect, selectively, certain of the suction chambers of average mixed gas temperature, as for example, chambers 8 to 11 to either manifold A or B, pipes $D_1$, $D_2$, and $D_3$ are joined between manifolds A and B, said pipes having shut off valves $F_1$, $F_2$, and $F_3$, respectively. Similar valves $S_1$, $S_2$, and $S_3$ are positioned in manifold B. Between chamber 16 and separator EGR, a pipe H containing valve $F_4$ inserted between manifolds A and B, with a valve $S_4$ placed in manifold A so that a portion of the mechanically dust separated gases at a temperature below 100° C. can be passed into the higher temperature gases in manifold B in order to adjust the humidity of the gases and dust particles flowing into filter EGR under desirable conditions. Thus, when the gases in manifold B are too hot, their temperature can be reduced by the addition of gases taken from manifold A, and therefore disruptive discharges in filter EGR due to over-dry gases and dust can be avoided.

In Figure 2, instead of employing the individual mechanical separators of Figure 1, each manifold A and B can be provided with a single dust separator $V_1$ and $V_2$ for serving all of the chambers 1 to 16. However, separators $V_1$ and $V_2$ can be employed along with the individual separators V in Figure 1 if desired.

A gas flame heater can be used to heat manifold A between valve $S_4$ and suction fan C in order to prevent the formation of condensates in the lower temperature gases of manifold A and thus avoid corrosion in fan C. The heating flame can be controlled by a thermostat.

Figure 3 shows an apparatus with the sintering belt moving opposite to that of the belt of Figures 1 and 2, or in other words, in Figure 3 the sintering belt travels from the left to the right. Accordingly, the manifolds A and B are re-arranged as shown, with the manifold A still collecting the gases of lower temperature.

An example of this process of dust removal is given for the sintering of Lotharingian minette ores. The ores are agglomerated in a conventional manner on a sintering band at the rate of 70 tons per hour. Waste gases at an average temperature of 110° C. are withdrawn from the sintering material at the rate of 80 m.³/sec. In operation, it is estimated that the temperature of the material in the sintering bed in the burning zone is about 1500° C. The first 7 or 8 suction chambers starting from the beginning of the belt draw waste gas at the rate of from about 27 to 30 m.³/sec. These gases are humid and have a temperature of from about 70° to 80° C., which is close to their dew point. Furthermore, the quantity of dust, including the coarse material sucked from the sinter bed by the first 7 or 8 suction chambers, is about 20 to 30 kg./h. Of this amount, about 90 percent of the dust is filtered out by the mechanical separators V connected to each of the suction chambers, thus leaving about 10 percent of wet dust gas to be further cleaned. From this, about 8 percent of the dust is removed by a subsequent mechanical remover. The remaining 2 percent of wet fine dust passes through manifold A and is blown out through an exhaust stack.

From the higher temperature suction chambers from about chambers 9 to 16, from about 50 to 53 m.³/sec. of gas is obtained having an average temperature of about 150° C. at No. 9 chamber and rising to about 400° C. at No. 16 chamber. The quantity of coarse and fine dust particles is about 115 kg./h. at No. 9 chamber, increasing to about 400 kg./h. at No. 16 chamber. Of these quantities, the individual mechanical filters V remove the greatest portion of the dust. Manifold B receives amounts of dust ranging from about 15 kg./h. from No. 9 chamber up to 150 kg./h. from No. 16 chamber. In passing through electrical separator EGR about 99 percent of this fine dust is filtered out, with the remainder being passed through the exhaust stack.

In the treatment of materials such as lead and zinc ores, it has been known to take the waste gases from a sintering bed and divide them into separate flows of gases which are respectively rich and poor in their $SO_2$ content. However, the instant invention proceeds from a different concept of the separation of gases. This invention enables the most efficient removal of dust from waste gases by employing electrical means. Unless the gases are separated into flows according to their temperature and humidity, such electrical treatment is practically impossible. Consequently, the process has the advantage that the mechanical separation of dust can be combined with electrical separation for an over all better cleaning of dust from the gases. The process has been found particularly suitable in the sintering of poor iron ores, such as Lotharingian minette ores, as such ores produce high concentrations of dust particularly in the last fifth of the travel of the sintering belt.

Having now described the means by which the objects of the invention are obtained,

I claim:

1. In the process of removing dust from waste gases by mechanical and electrical means in an ore sintering apparatus, the improvement comprising withdrawing waste gases separately from a first and a second portion, respectively, of the ore being sintered, the gas from the first portion having a temperature less than 100° C. and the gas from the second portion having a temperature more than 100° C., mechanically separating dust from the gas withdrawn from said first portion, and electrically separating dust from the gas withdrawn from said second portion.

2. In the process of claim 1, further comprising adjustably intermingling the gas withdrawn from said first portion with the gas withdrawn from said second portion.

3. In the process of claim 1, further comprising heating the gas withdrawn from said first portion to a temperature above the formation of condensates therein.

4. In the process of claim 1, said gas withdrawn from said first portion comprising at least one third of the entire gas withdrawn from the ore being sintered.

References Cited in the file of this patent
UNITED STATES PATENTS

| | | |
|---|---|---|
| 1,479,270 | Wolcolt | Jan. 1, 1924 |
| 1,806,899 | Greenawalt | May 26, 1931 |
| 2,283,053 | Gohre | May 12, 1942 |
| 2,493,421 | Rolforn | Jan. 3, 1950 |
| 2,537,558 | Tigges | Jan. 9, 1951 |
| 2,696,892 | Campbell | Dec. 14, 1954 |
| 2,729,301 | Ekstrom | Jan. 3, 1956 |
| 2,746,563 | Harlow | May 22, 1956 |